United States Patent
Tooyama et al.

(10) Patent No.: US 8,532,662 B2
(45) Date of Patent: Sep. 10, 2013

(54) MOBILE COMMUNICATION SYSTEM, NETWORK APPARATUS, AND MOBILE COMMUNICATION METHOD

(75) Inventors: Hiroto Tooyama, Tokyo (JP); Yoshifumi Morihiro, Tokyo (JP); Kouji Makino, Tokyo (JP); Midori Mori, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/642,687

(22) PCT Filed: Apr. 21, 2011

(86) PCT No.: PCT/JP2011/059783
§ 371 (c)(1),
(2), (4) Date: Dec. 4, 2012

(87) PCT Pub. No.: WO2011/132728
PCT Pub. Date: Oct. 27, 2011

(65) Prior Publication Data
US 2013/0072194 A1 Mar. 21, 2013

(30) Foreign Application Priority Data
Apr. 21, 2010 (JP) ................ P2010-098206

(51) Int. Cl.
*H04W 36/00* (2009.01)
(52) U.S. Cl.
USPC ............... 455/436; 370/331; 709/223

(58) Field of Classification Search
USPC .............. 455/436, 414.1, 403; 370/331, 230; 709/223
See application file for complete search history.

(56) References Cited

U.S. PATENT DOCUMENTS 8,015,271 B2 * 9/2011 McKeown et al. ............ 709/223
2009/0061876 A1 * 3/2009 Ho et al. ................... 455/436

FOREIGN PATENT DOCUMENTS
| JP | 2008 236269 | 10/2008 |
|---|---|---|
| JP | 2009 290585 | 12/2009 |
| WO | 2009 021074 | 2/2009 |

OTHER PUBLICATIONS

Japanese Office Action Issued Apr. 4, 2012 in JP Patent Application No. 2010-098206 (with English translation).
International Search Report Issued May 24, 2011 in PCT/JP11/059783 Filed Apr. 21, 2011.

* cited by examiner

*Primary Examiner* — Phuoc Doan
(74) *Attorney, Agent, or Firm* — Oblon, Spivak, McClelland, Maier & Neustadt, L.L.P.

(57) ABSTRACT

A second communication system starts transmission of direct data received from a core network apparatus without waiting to receive an end marker when the end marker indicating the last forwarding data forwarded from the first communication system is not received within an end marker waiting period.

10 Claims, 5 Drawing Sheets

US 8,532,662 B2

MOBILE COMMUNICATION SYSTEM, NETWORK APPARATUS, AND MOBILE COMMUNICATION METHOD

TECHNICAL FIELD

The present invention relates to a mobile communication system including a first communication system and a second communication system, a network apparatus provided in the second communication system, and a mobile communication method used in the mobile communication system.

BACKGROUND ART

In a mobile communication system, the Inter-RAT handover has been known as a procedure for a mobile communication terminal (UE) to switch from connection with a first communication system (a first RAT (Radio Access Technorolgy) to connection with a second communication system (a second RAT).

Here, for the Inter-RAT handover, there has been known a technique (Forwarding technique) with which data (packets) already received by a first communication system is forwarded from the first communication system to a second communication system when a transition from the first communication system to the second communication system is determined. Also, for the Inter-RAT handover, there has been known a technique (Reordering technique) of reordering data forwarded from the first communication system (hereinafter, forwarding data) and data directly received by the second communication system from a core network (hereinafter, direct data).

In this connection, for transition in the same RAT (Intra-RAT handover), there has been proposed a technique with which data is forwarded from a transition source base station to a transition target base station, and the transition target base station buffers the data forwarded from the transition source for a certain period of time (e.g., PATENT DOCUMENT 1).

Here, the Inter-RAT handover utilizes an end marker indicating the last data of the forwarding data forwarded from the first communication system. The second communication system is configured to start transmission of the direct data when the end marker is forwarded from the first communication system.

However, if the second communication system cannot receive the end marker because the end marker is lost on a forwarding path of the end marker, the second communication system cannot start the transmission of the direct data. Also, if the end marker is greatly delayed on the forwarding path of the end marker, the transmission of the direct data is delayed, which results in decreasing the throughput.

PRIOR ART DOCUMENT

Patent Document

PATENT DOCUMENT: Japanese Patent Application Publication No. 2008-236269

SUMMARY OF THE INVENTION

A mobile communication system according to the first feature includes a first communication system and a second communication system and configured to forward forwarding data, which the first communication system has already received from a core network apparatus, from the first communication system to the second communication system when a transition from the first communication system to the second communication is determined. When an end marker indicating the last forwarding data forwarded from the first communication system is not received within an end marker waiting period, the second communication system starts transmission of direct data received from the core network apparatus without waiting to receive the end marker.

In the first feature, the second communication system may activate an end marker waiting timer for counting the end marker waiting period in response to the determination to execute the transition from the first communication system to the second communication system.

In the first feature, the second communication system may activate an end marker waiting timer for counting the end marker waiting period in response to reception of the first forwarding data forwarded from the first communication system.

In the first feature, the second communication system may activate a direct data delay suppression timer in response to the reception of the first direct data transmitted from the core network apparatus, the direct data delay suppression timer configured to count a direct data withholding period of withholding transmission of the direct data, and even before the end marker waiting period elapses, the second communication system starts transmission of the direct data when the direct data withholding period is over.

In the first feature, the second communication system may activate a forwarding data waiting timer in response to the determination of the transition from the first communication system to the second communication system, the forwarding data waiting timer configured to count a forwarding data reception waiting period of waiting for reception of the first forwarding data forwarded from the first communication system, and the second communication system starts transmission of the direct data when the first forwarding data forwarded from the first communication system is not received within the forwarding data reception waiting period.

A network apparatus according to the second feature is provided in a second communication system in a mobile communication system including a first communication system and the second communication system and configured to forward forwarding data, which the first communication system has already received from a core network apparatus, from the first communication system to the second communication system when a transition from the first communication system to the second communication system is determined. The network apparatus includes a transmission unit configured to, when an end marker indicating the last forwarding data forwarded from the first communication system is not received within an end marker waiting period, starting transmission of direct data received from the core network apparatus without waiting to receive the end marker.

A mobile communication method according to the third feature is used in a mobile communication system including a first communication system and a second communication system and configured to forward forwarding data, which the first communication system has already received from a core network apparatus, from the first communication system to the second communication system when a transition from the first communication system to the second communication is determined. The method includes the step of, when an end marker indicating the last forwarding data forwarded from the first communication system is not received within an end marker waiting period, starting transmission of direct data, received from the core network apparatus, by the second communication system without waiting to receive the end marker.

A mobile communication system according to the fourth feature includes a first communication system and a second communication system and configured to forward forwarding data, which the first communication system has already received from a core network apparatus, from the first communication system to the second communication system when a transition from the first communication system to the second communication system is determined. When an end marker indicating the last forwarding data transmitted from the core network is not received within an end marker waiting period, the first communication system starts transmission of a dummy end marker to the second communication system without waiting to receive the end marker.

A network apparatus according to the fifth feature is provided in a second communication system in a mobile communication system including a first communication system and the second communication system, the mobile communication system configured to forward forwarding data, already received by the first communication system from a core network apparatus, from the first communication system to the second communication system when a transition from the first communication system to the second communication system is determined. The network apparatus includes a transmission unit configured to, when an end marker indicating the last forwarding data transmitted from the core network apparatus is not received within an end marker waiting period, transmit a dummy end marker to the second communication system without waiting to receive the end marker.

A mobile communication method according to the sixth feature is used in a mobile communication system including a first communication system and a second communication system, the mobile communication system configured to forward forwarding data, already received by the first communication system from a core network apparatus, from the first communication system to the second communication system when a transition from the first communication system to the second communication system is determined. The method includes the step of, when the first communication system does not receive an end marker within an end marker waiting period, transmitting a dummy end marker by the first communication system to the second communication system without waiting to receive the end marker, the end marker indicating the last forwarding data transmitted from the core network.

MODES FOR CARRYING OUT THE INVENTION

Figure 1:
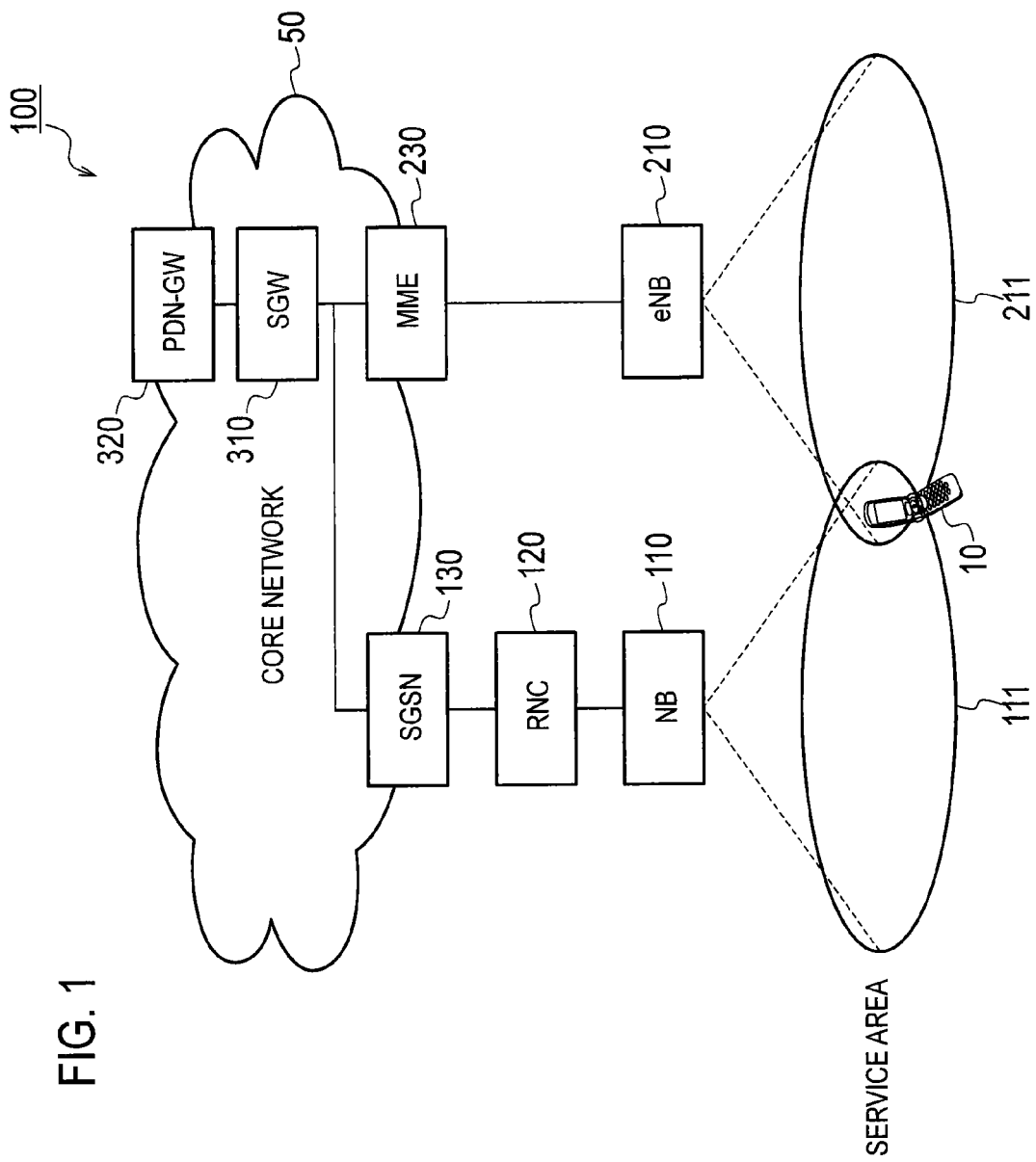
FIG. 1 is a drawing showing a mobile communication system 100 according to a first embodiment.

A mobile communication system according to an embodiment of the present invention is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

[Summary of Embodiment]

A mobile communication system according to an embodiment includes a first communication system and a second communication system, and is configured to forward forwarding data, which the first communication system has already received from a core network apparatus, from the first communication system to the second communication system when a transition from the first communication system to the second communication is determined.

Firstly, when an end marker indicating the last forwarding data forwarded from the first communication system cannot be received within an end marker waiting period, the second communication system starts transmission of direct data received from the core network apparatus without waiting to receive the end marker.

In the embodiment, the second communication system starts the transmission of the direct data received from the core network apparatus without waiting for the end marker, when the end marker cannot be received from the first communication system within the end marker waiting period. Accordingly, even if the end marker is lost or the end marker is delayed, the transmission of the direct data can be properly started.

Secondly, when the end marker indicating the last forwarding data transmitted from the core network apparatus cannot be received within the end marker waiting period, the first communication system transmits a dummy end marker to the second communication system without waiting to receive the end marker. Accordingly, even if the end marker is lost or the end marker is delayed between the core network apparatus and the first communication system, the transmission of the direct data can be properly started.

[First Embodiment]

(Configuration of Mobile Communication System)

The configuration of a mobile communication system according to a first embodiment is described below by referring to the drawings. FIG. 1 is a drawing showing a mobile communication system 100 according to the first embodiment.

As shown in FIG. 1, the mobile communication system 100 includes a mobile terminal device 10 (hereinafter, a UE 10) and a core network 50. In addition, the mobile communication system 100 includes a first communication system and a second communication system.

The first communication system is, for example, a communication system supporting LTE (Long Term Evolution). The first communication system has, for example, abase station 210 (hereinafter, an eNB 210) and an MME 230. Note that a first RAT (Radio Access Technorolgy) is used in the first communication system.

The second communication system is, for example, a communication system supporting UMTS (Universal Mobile Telecommunication System). The second communication system has a base station 110 (hereinafter, an NB 110), a RNC 120, and an SGSN 130. Note that a second RAT (Radio Access Technology) is used in the second communication system.

The UE 10 is a device (User Equipment) configured to perform communications with the first communication system and the second communication system. For example, the UE 10 has a function to perform radio communications with the NB 110 and has a function to perform radio communications with the eNB 210.

The NB 110 is a device (NodeB) having a cell 111 and configured to perform radio communications with the UE 10 present in the cell 111.

The RNC 120 is a device (Radio Network Controller) connected with the NB 110 and configured to establish a radio connection (RRC Connection) with the UE 10 present in the cell 111.

The SGSN 130 is a device (Serving GPRS Support Node) configured to exchange packets in a packet exchange domain. The SGSN 130 is provided in the core network 50. Although omitted in FIG. 1, a device (MSC; Mobile Switching Center) to perform line switching in a line switching domain may be provided in the core network 50.

The eNB 210 is a device (evolved NodeB) having a cell 211 and configured to perform radio communications with the UE 10 present in the cell 211.

The MME 230 is a device (Mobility Management Entity) configured to manage mobility of the UE 10 establishing the radio connection with the eNB 210. The MME 230 is provided in the core network 50.

Note that the cell should be understood as a function to perform radio communications with the UE 10. However, the cell may be considered as a service area showing an area capable of communicating with the cell. The cell is identified by a frequency, diffusion code, timeslot or the like which is used in the cell.

Here, the core network 50 has an SGW 310 and a PDN-GW 320.

The SGW 310 is a device (Serving Gateway) configured to function as an interface between the first communication system and the second communication system. The PDN-GW 320 is a device (Packet Data Network Gateway) configured to function as an interface between the core network 50 and an external network (such as WiMAX).

The first embodiment illustrates as an example a transition from the first communication system to the second communication system (Inter-RAT handover). When the Inter-RAT handover is determined, data (packets) already received by the first communication system is forwarded (Forwarding technique) from the first communication system to the second communication system. Also, the second communication system performs reordering (Reordering technique) of the forwarding data forwarded from the first communication system and the direct data received from the core network 50.

Also, in the first embodiment, the second communication system basically starts transmission of the direct data when an end marker indicating that the forwarding data forwarded from the first communication system is the last date is forwarded from the first communication system.

(Configuration of Network Apparatus)

Figure 2:
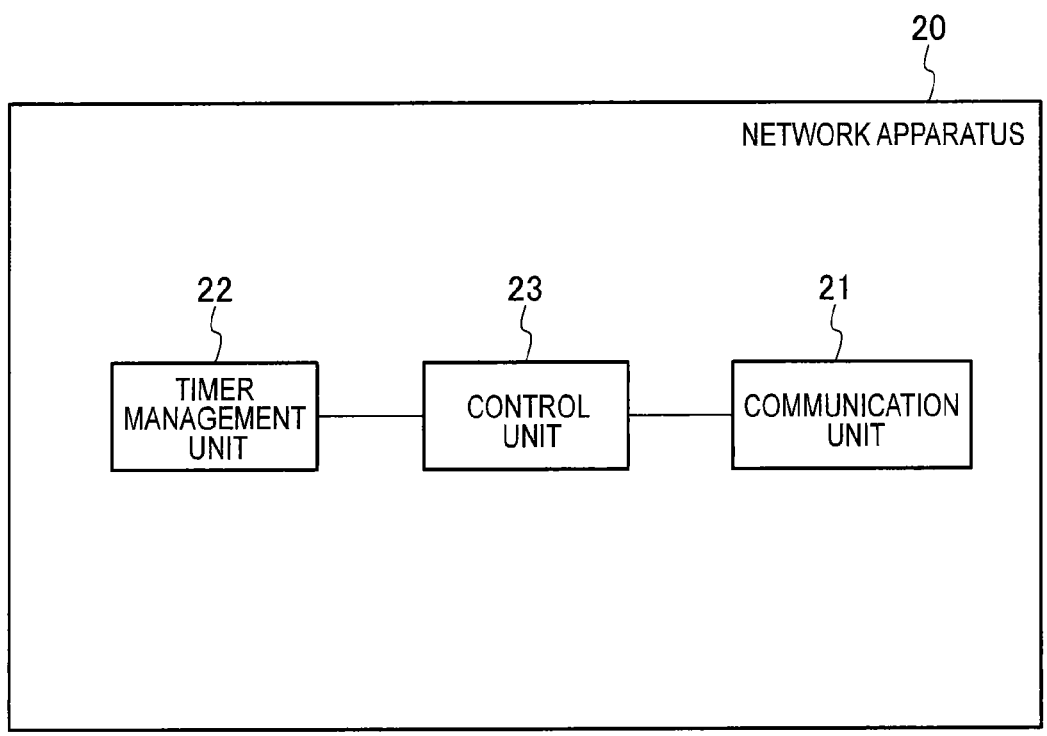
FIG. 2 is a block diagram showing a network apparatus 20 according to the first embodiment.

The configuration of the network apparatus according to the first embodiment is described below by referring to the drawings. FIG. 2 is a drawing showing the network apparatus 20 according to the first embodiment.

In the first embodiment, the network apparatus 20 is provided in the second communication system. For example, the network apparatus 20 is a RNC 120. As shown in FIG. 2, the network apparatus 20 has a communication unit 21, a timer management unit 22, and a control unit 23.

The communication unit 21 performs communications with other network apparatuses. For example, the communication unit 21 receives the forwarding data from the network apparatus (e.g., the eNB 210 or MME 230) provided in the first communication system. Or, the communication unit 21 may receive the forwarding data via the SGSN 130. Or, the communication unit 21 may receive the forwarding data via the network apparatus (e.g., the SGW 310) provided in the core network 50. Also, the communication unit 21 receives the direct data from the network apparatus (e.g., the SGW 310) provided in the core network 50.

The communication unit 21 performs communications with the UE 10. For example, the communication unit 21 transmits the forwarding data to the UE 10. In addition, the communication unit 21 transmits the direct data to the UE 10.

The timer management unit 22 manages various kinds of timers. Firstly, the timer management unit 22 manages an end marker waiting timer for counting a time period of waiting for an end marker during which the end marker indicating the last forwarding data forwarded from the first communication system is waited. Secondly, the timer management unit 22 manages a direct data delay suppression timer for counting a direct data withholding period of withholding transmission of the direct data. Thirdly, the timer management unit 22 manages a forwarding data waiting timer for counting a forwarding data reception waiting period of waiting to receive the first forwarding data forwarded from the first communication system.

The control unit 23 controls the network apparatus 20. For example, the control unit 23 performs reordering (Reordering technique) of the forwarding data forwarded from the first communication system and the direct data received from the core network 50.

Here, the control unit 23 transmits the forwarding data and the direct data in the following methods.

(1) First Method

A first method uses the end marker waiting timer and the direct data delay suppression timer. Firstly, the control unit 23 activates the end marker waiting timer in response to the determination to execute the transition from the first communication system to the second communication system. Specifically, the control unit 23 activates the end marker waiting timer in response to a message (e.g., "Relocation Request") received from the SGSN 130.

Secondly, the control unit 23 activates the direct data delay suppression timer in response to the reception of the first direct data transmitted from the core network 50 (e.g., the SGW 310).

Here, the control unit 23 starts the transmission of the direct data without waiting to receive the end marker when the end marker cannot be received within the end marker waiting period counted by the end marker waiting timer.

Also, even before the end marker waiting period elapses, the control unit 23 starts the transmission of the direct data when the direct data withholding period counted by the direct data delay suppression timer is over.

Note that the control unit 23 may discard the forwarding data received after the transmission of the direct data is started. In addition, the direct data delay suppression timer may be omitted.

Furthermore, the control unit 23 may be configured to release various kinds of resources (path release, buffer clearance along with discarding of the forwarding data, termination of forwarding process, or the like) to be used for data forwarding between the first communication system and the second communication system without waiting to receive the end marker when the end marker cannot be received within the end marker waiting period counted by the end marker waiting timer.

(2) Second Method

A second method uses the forwarding data waiting timer and the end marker waiting timer. Firstly, the control unit 23 activates the forwarding data waiting timer in response to the determination to execute the transition from the first communication system to the second communication system. Specifically, the control unit 23 activates the forwarding data waiting timer in response to a message (e.g., "Relocation Request") received from the SGSN 130.

Secondly, the control unit 23 activates the end marker waiting timer in response to the reception of the first forwarding data forwarded from the first communication system.

Here, the control unit 23 starts the transmission of the direct data when the first forwarding data forwarded from the first communication system is not received within a forwarding data reception waiting period counted by the forwarding data waiting timer.

Also, the control unit 23 starts the transmission of the direct data without waiting to receive the end marker when the end marker cannot be received within the end marker waiting period counted by the end marker waiting timer.

Note that the control unit 23 may discard the forwarding data received after the transmission of the direct data is started. Also, the forwarding data waiting timer may be omitted.

Furthermore, the control unit 23 may be configured to release various kinds of resources (path release, buffer clearance along with discarding of the forwarding data, termination of forwarding process, or the like) to be used for data forwarding between the first communication system and the second communication system when the first forwarding data forwarded from the first communication system is not received within the forwarding data waiting period counted by the forwarding data waiting timer.

(Application Example of First Method)

Figure 3:
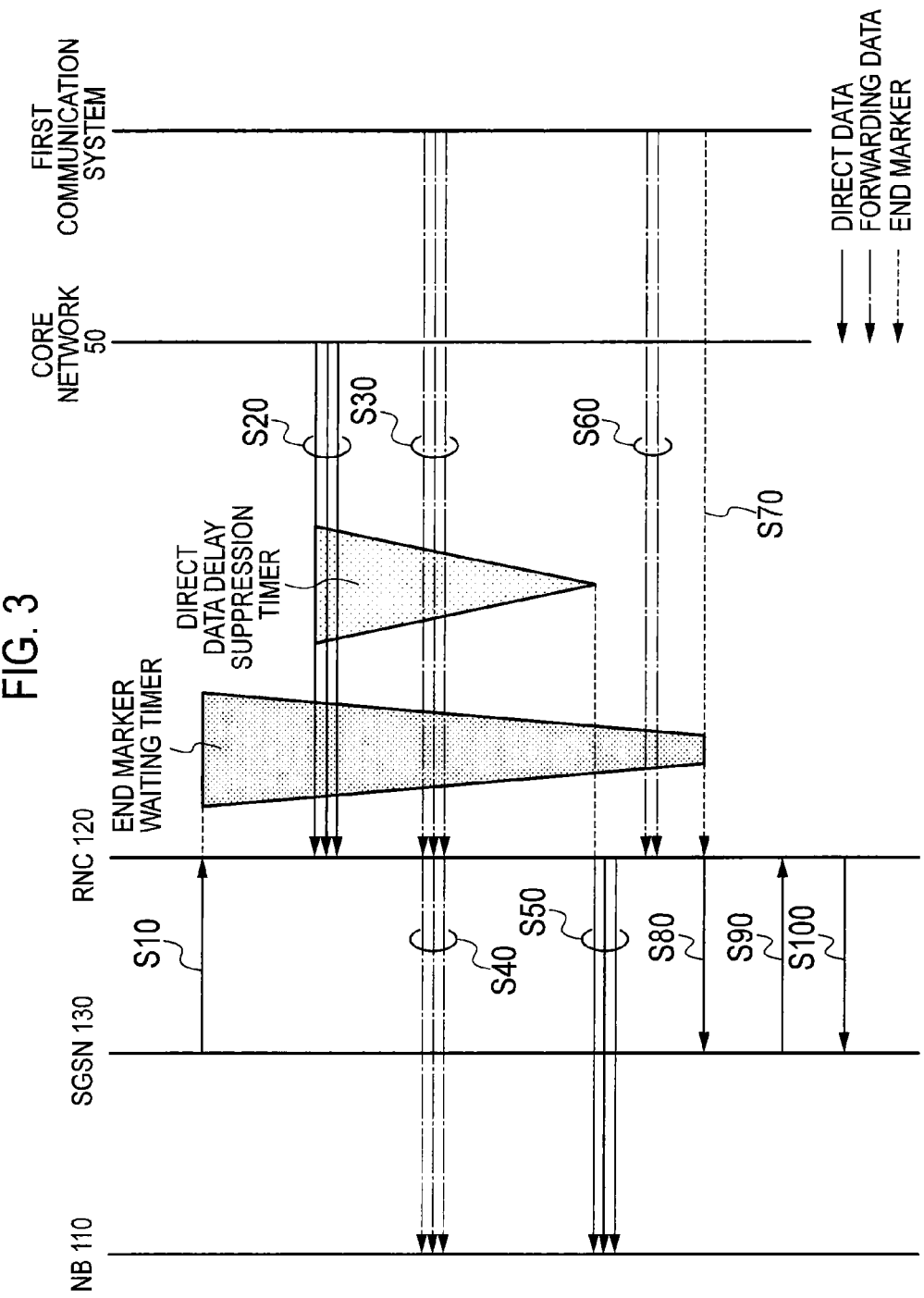
FIG. 3 is a sequence diagram showing an application example of a first method according to the first embodiment.

An application example of the first method according to the first embodiment is described below by referring to the drawings. FIG. 3 is a sequence diagram showing an application example of the first method according to the first embodiment.

As shown in FIG. 3, at Step 10, the SGSN 130 transmits a message (e.g., "Relocation Request") notifying determination to execute a transition from the first communication system to the second communication system to the RNC 120.

Here, the RNC 120 activates the end marker waiting timer in response to the reception of the message (e.g., "Relocation Request").

At Step 20, the core network 50 (e.g., the SGW 310) transmits the direct data to the RNC 120. Note that the RNC 120 suspends the transmission of the direct data without immediately transmitting the direct data.

Here, the RNC 120 activates the direct data delay suppression timer in response to the reception of the first direct data transmitted from the core network 50 (e.g., the SGW 310).

At Step 30, the first communication system transmits the forwarding data to the RNC 120. Note that the forwarding data may be forwarded directly to the RNC 120 from the eNB 210 with the tunneling technique. Or, the forwarding data may be forwarded from the eNB 210 via the SGW 310. Or, the forwarding data may be forwarded from the eNB 210 via the SGSN 130.

At Step 40, the RNC 120 transmits the forwarding data to the NB 110. Specifically, the RNC 120 transmits the forwarding data prior to the direct data.

At Step 50, the RNC 120 starts the transmission of the direct data because a direct data withholding period counted by the direct data delay suppression timer is over. In other words, even before the end marker waiting period elapses, the RNC 120 starts the transmission of the direct data in response to the passage of the direct data standby time period.

At Step 60, the first communication system transmits the forwarding data to the RNC 120. However, since the transmission of the direct data has been started, the RNC 120 discards the forwarding data without transmitting the forwarding data.

At Step 70, the first communication system transmits the end marker indicating the last forwarding data forwarded from the first communication system to the RNC 120.

At Step 80, the RNC 120 transmits a message (e.g., "Relocation Complete") indicating that the forwarding of the forwarding data was completed.

At Step 90, the SGSN 130 transmits a message of requesting deletion of the resource to be used for a forwarding path of the forwarding data.

At Step 100, the RNC 120 transmits a response message to the SGSN 130 in response to the delete request message.

(Application Example of Second Method)

Figure 4:
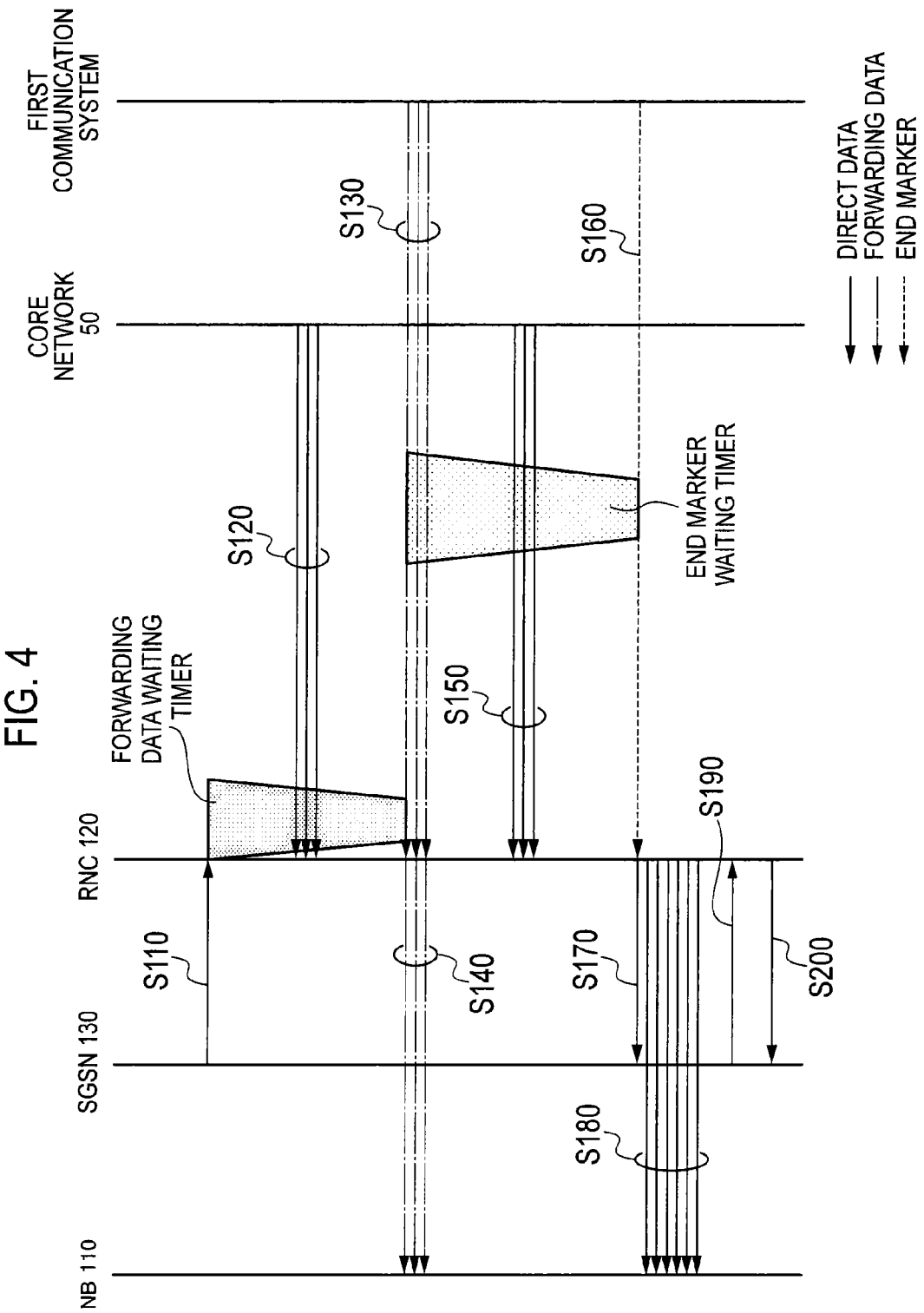
FIG. 4 is a sequence diagram showing an application example of a second method according to the first embodiment.

An example of applying a second method according to the first embodiment is described below by referring to the drawings. FIG. 4 is a sequence diagram showing an application example of the second method according to the first embodiment.

As shown in FIG. 4, at Step 110, the SGSN 130 transmits a message (Relocation Request) notifying determination to execute a transition from the first communication system to the second communication system to the RNC 120.

Here, the RNC 120 activates the forwarding data waiting timer in response to the reception of the message (Relocation Request).

At Step 120, the core network 50 (e.g., the SGW 310) transmits the direct data to the RNC 120. Note that the RNC 120 suspends the transmission of the direct data without immediately transmitting the direct data.

At Step 130, the first communication system transmits the forwarding data to the RNC 120. Note that the forwarding data may be forwarded directly to the RNC 120 from the eNB 210 with the tunneling technique. Or, the forwarding data may be forwarded from the eNB 210 via the SGW 310. Or, the forwarding data may be forwarded from the eNB 210 via the SGSN 130.

Here, the first forwarding data forwarded from the first communication system is received within the forwarding data reception waiting period counted by the forwarding data waiting timer, so that the RNC 120 activates the end marker waiting timer in response to the reception of the first forwarding data.

At Step 140, the RNC 120 transmits the forwarding data to the NB 110. Specifically, the RNC 120 transmits the forwarding data prior to the direct data.

At Step 150, the core network 50 (e.g., the SGW 310) transmits the direct data to the RNC 120. Note that the RNC 120 suspends the transmission of the direct data without immediately transmitting the direct data.

At Step 160, the first communication system transmits the end marker indicating the last forwarding data forwarded from the first communication system to the RNC 120.

At Step 170, the RNC 120 transmits a message (e.g., "Relocation Complete") indicating that the forwarding of the forwarding data was completed to the SGSN 130.

At Step 180, the RNC 120 receives the end marker, and starts the transmission of the direct data.

At Step 190, the SGSN 130 transmits a message of requesting deletion of the resource to be used for a forwarding path of the forwarding data.

At Step 200, the RNC 120 transmits a response message in response to the delete request message to the SGSN 130.

FIG. 4 illustrates an example of a case where the end marker is received within the end marker waiting period. However, when the end marker is not received within the end marker waiting period, the RNC 120 starts the transmission of the direct data. Furthermore, although not illustrated in the drawing, when the end marker is not received within the end marker waiting period, a various kinds of resources may be released.

Also, FIG. 4 illustrates an example of a case where the first forwarding data is received within the forwarding data waiting period. Instead, when the first forwarding data is not received within the forwarding data waiting period, the RNC 120 starts the transmission of the direct data.

(Advantageous Effects)

In the first embodiment, the second communication system (hereinafter, the network apparatus 20) starts the transmission of the direct data received from the core network apparatus without waiting to receive the end marker when the end marker cannot be received from the first communication system within the end marker waiting period. Accordingly, even if the end marker is lost or the end marker is delayed on the forwarding path of the end marker, the transmission of the direct data can be properly started.

Also, in the first embodiment, the second communication system (hereinafter, the network apparatus 20) releases the various kinds of resources without waiting to receive the end marker when the end marker cannot be received from the first communication system within the end marker waiting period. Accordingly, even when the end marker is lost or the end marker is delayed, the various kinds of resources can be effectively utilized.

Specifically, in the first method, even before the end marker waiting period elapses, the network apparatus 20 starts the transmission of the direct data in response to the passage of the direct data withholding period counted by the direct data delay suppression timer. In other words, the transmission of the direct data is started even within the end marker waiting period when the direct data has a long delay time. Accordingly, the delay of the direct data can be restricted. Also, since the various kinds of resources are released, unnecessary reserving of the resources can be prevented.

In the second method, the network apparatus 20 starts the transmission of the direct data when the first forwarding data forwarded from the first communication system is not received within the forwarding data reception waiting period counted by the forwarding data waiting timer. In other words, when the forwarding data is not forwarded from the first communication system, the delay time of the direct data can be prevented from becoming longer. Also, since the various kinds of resources are released, unnecessary reserving of the resources can be prevented.

[Second Embodiment]

A second embodiment is described below by referring to the drawings. In the following description, portions different from those of the first embodiment are described.

Specifically, in the first embodiment, an operation of the second communication system is mainly described in the transition from the first communication system to the second communication system. In contrast, in the second embodiment, an operation of the first communication system is mainly described in the transition from the first communication system to the second communication system.

Here, in the second embodiment, the first communication system transmits a dummy end marker to the second communication system without waiting to receive the end marker when the end marker cannot be received within the end marker waiting period.

Note that in the second embodiment, the above-described network apparatus 20 is provided in the first communication system. For example, the network apparatus 20 is an eNB 210. The configuration of the network apparatus 20 in the second embodiment is same as that of the first embodiment. However, the network apparatus 20 (a control unit 23) according to the second embodiment transmits a dummy marker to the second communication system without starting the transmission of the forwarding data when the end marker cannot be received within the end marker waiting period.

Specifically, firstly, the control unit 23 in the network apparatus 20 provided in the first communication system activates an end marker waiting timer in response to the determination to execute a transition from the first communication system to the second communication system. In particular, the control unit 23 activates the end marker waiting timer in response to a message (e.g., "Relocation Request") received from the SGSN 130.

Secondly, the control unit 23 transmits a dummy end marker without waiting to receive the end marker when the end marker cannot be received within the end marker waiting period counted by the end marker waiting timer.

Note that the control unit 23 may discard the forwarding data received after the transmission of the direct data is started. In addition, the direct data delay suppression timer may be omitted.

Furthermore, the control unit 23 may be configured to release various kinds of resources (path release, clear buffer along with discarding of the forwarding data, termination of forwarding process, or the like) to be used for data forwarding between the first communication system and the second communication system after transmitting the dummy end marker.

Note that the configuration of the dummy end marker is same as that of the end marker. The dummy end marker is created by the control unit 23.

(Example of Application)

Figure 5:
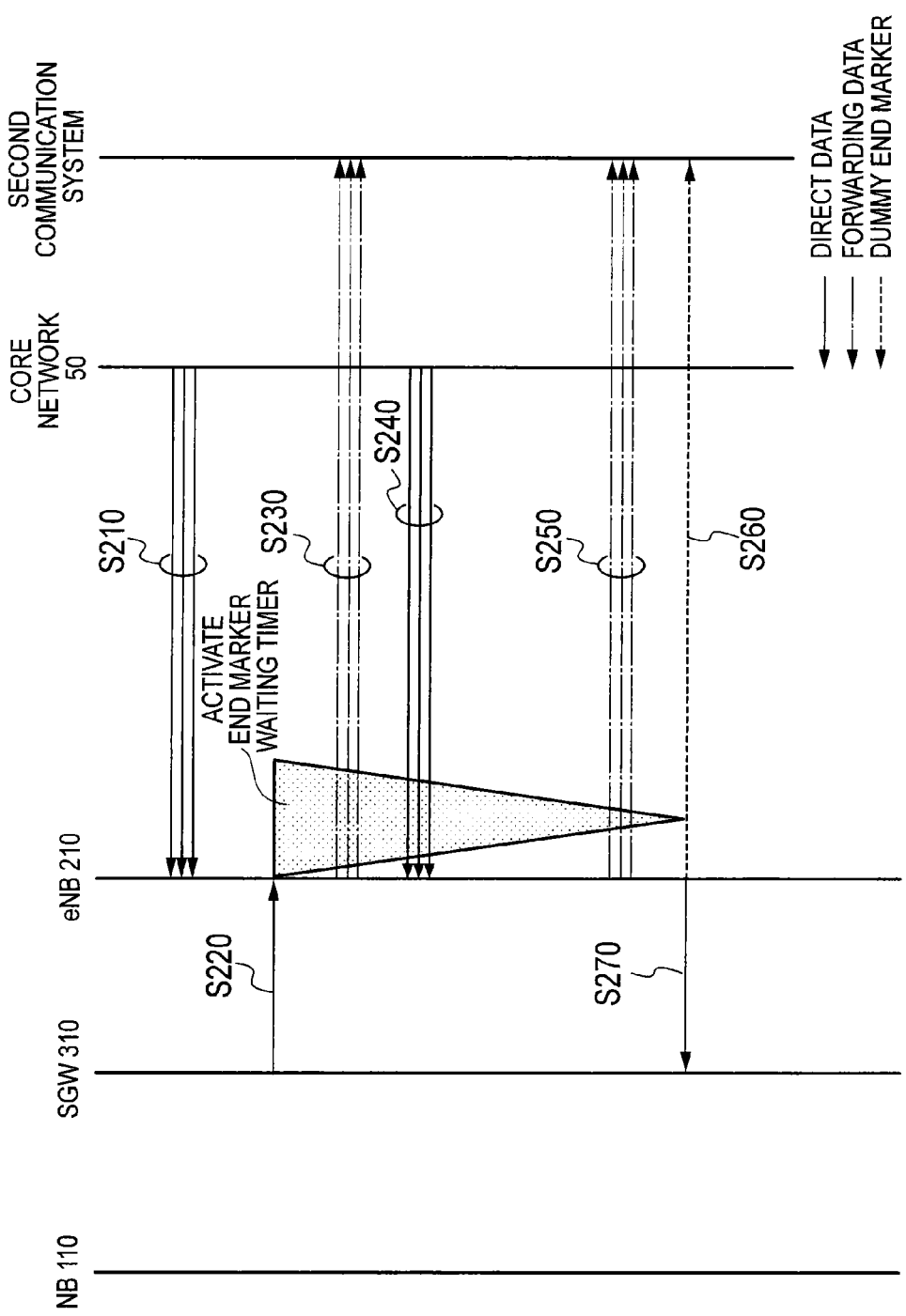
FIG. 5 is a sequence diagram showing an application example according to a second embodiment.

An example of application according to the second embodiment is described below by referring to the drawings. FIG. 5 is a sequence diagram showing an example of application according to the second embodiment.

As shown in FIG. 5, at Step 210, the core network 50 transmits the direct data from the first communication system to the eNB 210.

At Step 220, the SGW 310 transmits a message (e.g., "Relocation Request") notifying the determination to execute the transition from the first communication system to the second communication system.

Here, the eNB 210 activates an end marker waiting timer in response to the reception of the message (e.g., "Relocation Request").

At Step 230, the eNB 210 transmits data as forwarding data to the second communication system among data received from the core network 50 (direct data from the first communication system) in which transmittal confirmation from the UE 10 is not known.

Note that the forwarding data may be forwarded directly to the RNC 120 from the eNB 210 with the tunneling technology. Or, the forwarding data may be forwarded from the eNB 210 via the SGW 310. Or, the forwarding data may be forwarded from the eNB 210 via the SGSN 130.

At Step 240, the core network 50 transmits direct data from the first communication system to the eNB 210.

At Step 250, the eNB 210 transmits the data as the forwarding data to the second communication system among the data received from the core network 50 in which the transmittal confirmation from the UE 10 is not known because the end marker waiting period counted by the end marker waiting timer is not past.

At Step 260, the eNB 210 transmits a dummy end marker to the second communication system because the end marker waiting period is over.

At Step 270, the first communication system releases resources required for the communications between the UE 10 and the first communication system. The eNB 210 transmits a message (e.g., "Relocation Complete") indicating that the forwarding of the forwarding data was completed to the SGW 310.

(Advantageous Effects)

In the second embodiment, the first communication system (hereinafter, the network apparatus 20) transmits a dummy end marker to the second communication system without waiting to receive the end marker when first communication system cannot receive the end marker from the core network 50 within the end marker waiting period. Accordingly, even when the end marker is lost or is delayed on a forwarding path of the end marker (a forwarding path between the core network 50 and the first communication system), the transmission of the direct data can be properly started.

Also, in the first embodiment, the second communication system (hereinafter, the network apparatus 20) releases a various kinds of resources after transmitting a dummy end marker. Accordingly, even if the end marker is lost or the end marker is delayed on the forwarding path of the end marker (a forwarding path between the core network 50 and the first communication system), the various kinds of resources can be effectively utilized.

Specifically, the network apparatus 20 is enabled to transmit the direct data in the second communication system by transmitting the dummy end marker to the second communication system when the end marker waiting period expires. Also, the various kinds of resources are released, so that unnecessary reserving of the resources can be prevented.

[Other Embodiments]

The present invention has been described by using the above-described embodiments. However, it should not be understood that the description and the drawings, which constitute part of this disclosure, are to limit the present invention. Various alternative embodiments, examples, and operational techniques will be obvious for those who are in the art from this disclosure.

In the above-described embodiments, the first communication system is a communication system supporting LTE and the second communication system is a communication system supporting UMTS. However, the embodiment is not limited to that configuration. Specifically, the first communication system may be a communication system supporting UMTS and the second communication system may be a communication system supporting LTE.

In such a case, the network apparatus (e.g., the eNB 210) provided in the second communication system manages an end marker waiting timer, a direct data delay suppression timer, and a forwarding data waiting timer. The network apparatus (e.g., the eNB 210) controls the start of transmission of the direct data using these timers. Note that when the network apparatus is an eNB 210, in the first method, the eNB 210 activates the end marker waiting timer in response to a message (e.g., "Handover Request") received from the MME 230. Or, in the first method, the eNB 210 activates the forwarding data waiting timer in response to a message (e.g., "Handover Request") received from the MME 230.

Also, the first communication system and the second communication system are not limited to the communication systems supporting UMTS and LTE, but may be other communication systems (e.g., a communication system supporting WiMAX).

In the above-described embodiments, the details of the procedures of the Inter-RAT handover are omitted. However, the procedures of the Inter-RAT handover are known procedures (e.g., 3GPP TS23.401 v9.0.0 Subclause 5.5.2 "Inter RAT handover").

In the above-described embodiments, illustrated as an example is the case where the network apparatus 20 is the RNC 120. However, the embodiments are not limited to this configuration. The network apparatus 20 may be any apparatus as long as it is provided in the second communication system.

Note that an operation of the above-described network apparatus 20 may be implemented by hardware or may be implemented by a software module to be executed by a processor, or may be implemented in combination of the both.

The software module may be provided in any form of a recording medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

Such recording medium is connected with a processor so that the processor can read and write information on the recording medium. Also, such recording medium may be integrated with the processor. Or, such recording medium and the processor may be provided inside ASIC. Such ASIC may be provided inside the network apparatus 20. Or, such recording medium and the processor may be provided inside the network apparatus 20 as discrete components.

Note that the contents of Japanese Patent Application Publication No. 2010-098206 (filed on Apr. 21, 2010) are hereby incorporated by reference in their entirety.

INDUSTRIAL APPLICABILITY

The present invention can provide a mobile communication system, a network apparatus, and a mobile communication method, which enables proper start of transmission of direct data even if an end marker is lost or the end marker is delayed.

The invention claimed is:

1. A mobile communication system including a first communication system and a second communication system and configured to forward forwarding data, which the first communication system has already received from a core network apparatus, from the first communication system to the second communication system when a transition from the first communication system to the second communication is determined, wherein, when an end marker indicating the last forwarding data forwarded from the first communication system is not received within an end marker waiting period, the second communication system starts transmission of direct data received from the core network apparatus without waiting to receive the end marker.

2. The mobile communication system according to claim 1, wherein the second communication system activates an end marker waiting timer for counting the end marker waiting period in response to the determination to execute the transition from the first communication system to the second communication system.

3. The mobile communication system according to claim 2, wherein the second communication system activates a direct data delay suppression timer in response to the reception of the first direct data transmitted from the core network apparatus, the direct data delay suppression timer configured to count a direct data withholding period of withholding transmission of the direct data, and even before the end marker waiting period elapses, the second communication system starts transmission of the direct data when the direct data withholding period is over.

4. The mobile communication system according to claim 1, wherein the second communication system activates an end marker waiting timer for counting the end marker waiting period in response to reception of the first forwarding data forwarded from the first communication system.

5. The mobile communication system according to claim 3, wherein the second communication system activates a forwarding data waiting timer in response to the determination of the transition from the first communication system to the second communication system, the forwarding data waiting timer configured to count a forwarding data reception waiting period of waiting for reception of the first forwarding data forwarded from the first communication system, and the second communication system starts transmission of the direct data when the first forwarding data forwarded from the first communication system is not received within the forwarding data reception waiting period.

6. A network apparatus provided in a second communication system in a mobile communication system including a first communication system and the second communication system and configured to forward forwarding data, which the first communication system has already received from a core network apparatus, from the first communication system to the second communication system when a transition from the first communication system to the second communication system is determined, the network apparatus comprising:

a transmission unit configured to, when an end marker indicating the last forwarding data forwarded from the first communication system is not received within an end marker waiting period, starting transmission of direct data received from the core network apparatus without waiting to receive the end marker.

7. A mobile communication method used in a mobile communication system including a first communication system and a second communication system and configured to forward forwarding data, which the first communication system has already received from a core network apparatus, from the first communication system to the second communication system when transition from the first communication system to the second communication is determined, the method comprising the step of, when an end marker indicating the last forwarding data forwarded from the first communication system is not received within an end marker waiting period, starting transmission of direct data, received from the core network apparatus, by the second communication system without waiting to receive the end marker.

8. A mobile communication system including a first communication system and a second communication system and configured to forward forwarding data, which the first communication system has already received from a core network apparatus, from the first communication system to the second communication system when a transition from the first communication system to the second communication system is determined, wherein, when an end marker indicating the last forwarding data transmitted from the core network is not received within an end marker waiting period, the first communication system starts transmission of a dummy end marker to the second communication system without waiting to receive the end marker.

9. A network apparatus provided in a second communication system in a mobile communication system including a first communication system and the second communication system, the mobile communication system configured to forward forwarding data, already received by the first communication system from a core network apparatus, from the first communication system to the second communication system when a transition from the first communication system to the second communication system is determined, the network apparatus comprising:

a transmission unit configured to, when an end marker indicating the last forwarding data transmitted from the core network apparatus is not received within an end marker waiting period, transmit a dummy end marker to the second communication system without waiting to receive the end marker.

10. A mobile communication method used in a mobile communication system including a first communication system and a second communication system, the mobile communication system configured to forward forwarding data, already received by the first communication system from a core network apparatus, from the first communication system to the second communication system when a transition from the first communication system to the second communication system is determined, the method comprising the step of, when the first communication system does not receive an end marker within an end marker waiting period, transmitting a dummy end marker by the first communication system to the second communication system without waiting to receive the end marker, the end marker indicating the last forwarding data transmitted from the core network.

* * * * *